United States Patent Office 3,503,659
Patented Mar. 31, 1970

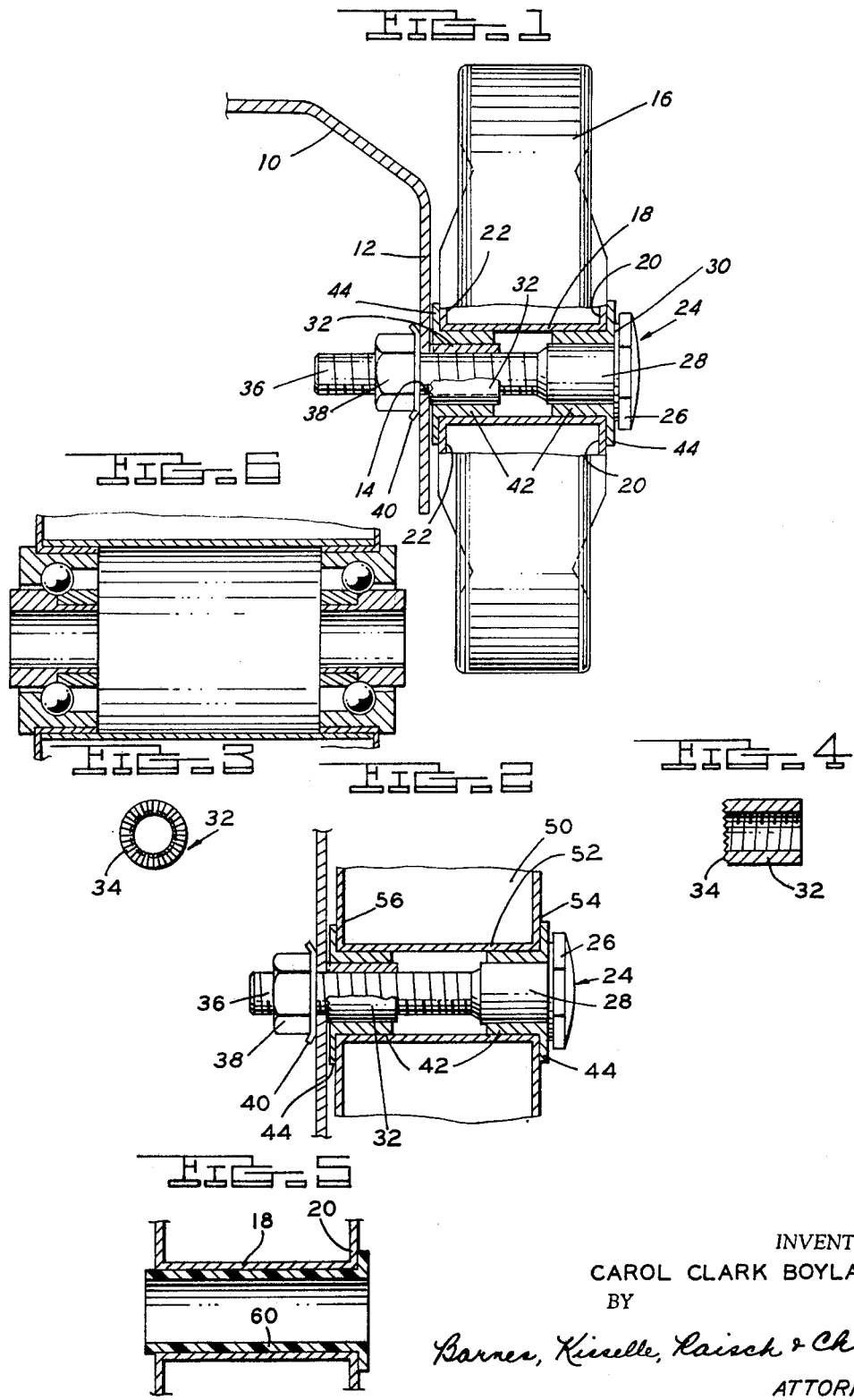

3,503,659
WHEEL MOUNT ADAPTER
Carol Clark Boylan, Cass City, Mich., assignor to Walbro Corporation, Cass City, Mich., a corporation of Michigan
Filed Aug. 5, 1968, Ser. No. 750,180
Int. Cl. F16c *13/04*
U.S. Cl. 308—16                                    1 Claim

ABSTRACT OF THE DISCLOSURE

An adapter wheel mount assembly for small load-bearing wheels such as used on lawn mowers and the like which permits replacement of bearings and other wearing parts, the adapter comprising essentially a headed bolt having a shoulder adjacent the head together with a sleeve threadable on the shank of the bolt having a diameter the same as the shoulder on the bolt, the shoulder and the sleeve serving as spaced mounts for bearing collars of a wheel, these being adjustable axially to accommodate wheels of varying axle widths and having different type bearings, the assembly being mounted in cantilever fashion on an apertured wall with all the parts in locked position.

---

This invention relates to a wheel mount adapter for small wheels such as are used on lawn mowers and the like.

It is an object of the invention to provide an adapter assembly which can be used to replace worn parts of a wheel and which is so designed that it can be used on a number of different wheels having differing axial dimensions without interfering with the bearing assembly or the mounting stability.

It is a further object to provide a wheel mount adapter assembly which is relatively inexpensive and which can be easily assembled as a replacement part and which is adaptable to many types of wheels, thus avoiding the stacking of ten to a dozen different lengths of shoulder bolts to accumulate the various wheels.

It is a further object of the invention to provide a wheel mount adapter assembly which has a self-locking feature which anchors the parts of the assembly in a solid position, the parts cooperating to stabilize the assembly on a mounting wall.

Other objects and features of the invention will be apparent in the following description and claim in which the principle of operation is explained together with the best mode contemplated by the inventor to accomplish the objects and purposes of the invention.

Drawings accompany the disclosure and the various views thereof may be briefly described as:

FIGURE 1, an assembly view partially in section showing the relative position of the various parts.

FIGURE 2, a sectional view similar to that of FIGURE 1 showing the use of the assembly in a wheel of modified dimension.

FIGURE 3, an end view of an adjustable sleeve.

FIGURE 4, a sectional view of the sleeve.

FIGURE 5, a sectional view of a modified wheel and bearing.

FIGURE 6, a sectional view of a ball-bearing type wheel.

Referring to the drawings, a mower deck wall 10 has a vertical wall 12 apertured at 14 to receive a supporting shaft for a wheel. The wheel 16 of FIGURE 1 has a central opening formed by a cylindrical wall 18 which terminates at side walls 20 and 22 of the wheel.

The main support for the wheel comprises a headed bolt 24 having a head 26 and a shoulder 28 adjacent that head. A relatively short shoulder 30 separates the inner surface of the head of the bolt from the shoulder 28. Carried on the bolt is a threaded sleeve 32 having a serrated end 34 as shown in FIGURE 3. This sleeve is shown in section in FIGURE 4. The threaded shank 36 of the bolt 24 passes through the opening 14 in the wall 12 and a nut 38 with a lock washer 40 anchors the bolt securely to the wall. Wheel bearings in the form of flanged bearing hubs 42 formed from Oilite material or a bearing plastic are dimensioned to have a running clearance on the shoulder 28 and the sleeve 32, the outwardly extending flanges 44 of these wheel bearings being positioned along the walls 20 and 22 of the wheel.

As the assembly is shown in FIGURE 1, it will be seen that the sleeve 32 is suitably adjusted on the threaded shank 36 to provide a proper axial dimension clearance between the wall 12 and the head of the supporting bolt. The bearing hubs 42 are then slipped on the bolt together with the wheel and the bolt 38 together with the lock nut 40 can be tightened to hold the assembly in cantilever fashion on the wall 12. The wheel sleeve 32 is so positioned that the bearing flanges 44 have axial clearance such that the wheel has a good running clearance on the support without binding the assembly.

As shown in FIGURE 2, the same parts are assembled with a wheel 50 having a central cylindrical wall 52 and side walls 54 and 56 have substantially longer axial dimensions than the wheel shown in FIGURE 1. In this instance the sleeve 32 is adjusted outwardly on the threaded shank 36 to a proper axial dimension and the parts are assembled in the same fashion.

FIGURE 5 shows a different type of bearing sleeve 60 formed of Teflon or nylon but extending the full length of the axial dimension of the wheel. The bearing sleeves in each case preferably have a tight fit with the wheel opening. In the case of the full length bearing sleeve the essential support on the shoulder 28 and sleeve 32 is furnished at the ends where the loading takes place and the friction is less than if the contact area was full length.

In FIGURE 6, a ball bearing type assembly is illustrated and here again it will be seen that the shoulder 28 and the sleeve 32 will be positioned for proper support of the inner bearing race at each side respectively.

It will thus be seen that the bolt 24 with the shoulder 28 together with the bearing mount sleeve 32 can be adapted for use with great variety of wheels without sacrificing any stability in the wheel mount. It will be noted that the stability is established by reason of the tightening of the nut 38 and the lock washer 41 with the serrated end of the sleeve 32 being in direct engagement with the wall, thus insuring a solid cantilever mount for the bolt. In addition, the serrated end of the sleeve 32 enables the sleeve to carry the shear load, thus relieving the bolt of strain in this regard and insures a positive lock for the bolt and nut.

What is claimed as new is as follows:

1. An adapter wheel mount assembly for use as a cantilever mount on an apertured wall for a wheel having a central opening which comprises a headed bolt having a threaded shank and a cylindrical shoulder of larger diameter than said shank and smaller than the head positioned adjacent the head, a sleeve threaded on said shank having an external diameter substantially the same as said shoulder, a pair of flanged bearing hubs having an inside diameter dimensioned to have a running fit with said shoulder and said sleeve and an outside diameter to fit in the central opening of a wheel.

said mount being held on a wall support by a nut on said shank adapted to bear against said support and one end of said sleeve.

References Cited

UNITED STATES PATENTS 1,448,686   3/1923   Druar  --------------- 308—120

MARTIN P. SCHWADRON, Primary Examiner

F. SUSKO, Assistant Examiner